(12) United States Patent
Foreman et al.

(10) Patent No.: US 7,472,052 B2
(45) Date of Patent: Dec. 30, 2008

(54) METHOD, APPARATUS AND COMPUTER PROGRAM PRODUCT FOR SIMULATING A STORAGE CONFIGURATION FOR A COMPUTER SYSTEM

(75) Inventors: Dugald Foreman, Camberley (GB); Timothy Uglow, Farnham (GB)

(73) Assignee: Sun Microsystems, Inc., Santa Clara, CA (US)

( * ) Notice: Subject to any disclaimer, the term of this patent is extended or adjusted under 35 U.S.C. 154(b) by 580 days.

(21) Appl. No.: 10/858,423

(22) Filed: Jun. 1, 2004

(65) Prior Publication Data

US 2004/0254777 A1 Dec. 16, 2004

(30) Foreign Application Priority Data

Jun. 12, 2003 (GB) .................................. 0313638.9

(51) Int. Cl.
*G06F 9/44* (2006.01)
(52) U.S. Cl. ....................................................... 703/21
(58) Field of Classification Search .................... 703/21
See application file for complete search history.

(56) References Cited

U.S. PATENT DOCUMENTS

| | | | |
|---|---|---|---|
| 5,987,565 A | 11/1999 | Gavaskar | 711/11 |
| 6,182,242 B1 | 1/2001 | Brogan et al. | 714/26 |
| 6,629,204 B2 * | 9/2003 | Tanaka et al. | 711/114 |

OTHER PUBLICATIONS

Helen Custer, "Inside Windows NT", 1993, Microsoft Press, pp. 241-267.*
Abraham Silberschatz et al; "Operating System Concepts", fifth edition, 1999, John Wiley & Sons, pp. 475 and 540-541.*
Mei-Chen Hsueh et al.; "Fault Injection Techniques and Tools", 1997, Computer, vol. 30, Issue 4, pp. 75-82.*
International search report application No. GB0313638.9 mailed Dec. 19, 2003.
Examination Report under Section 18(3), application No. GB0313638.9. Sep. 15, 2005.

* cited by examiner

*Primary Examiner*—Paul L Rodriguez
*Assistant Examiner*—Russ Guill
(74) *Attorney, Agent, or Firm*—Meyertons Hood Kivlin Kowert & Goetzel, P.C.; Rory D. Rankin

(57) ABSTRACT

An apparatus and method are provided for simulating a target storage configuration for a computer system. In particular, a storage command is received from an application running on the computer system into a storage protocol stack on the computer system. The storage protocol stack is part of an operating system of the computer system and runs in kernel mode. The storage command is intercepted within the storage protocol stack by a kernel simulator module incorporated into the storage protocol stack. The intercepted storage command is forwarded from the kernel simulator module to a userland simulator module running in user mode. The userland simulator module generates a response to the storage command, where the response emulates the behavior of the target storage configuration. The response is then sent from the userland simulator module to the kernel simulator module, to be returned from the kernel simulator module to the application via the storage protocol stack.

36 Claims, 6 Drawing Sheets

METHOD, APPARATUS AND COMPUTER PROGRAM PRODUCT FOR SIMULATING A STORAGE CONFIGURATION FOR A COMPUTER SYSTEM

FIELD OF THE INVENTION

The present invention relates to simulating a storage configuration for a computer system, such as for use in developing new systems and error diagnosis of existing systems.

BACKGROUND OF THE INVENTION

Many modern commercial computing applications rely upon large amounts of data storage. This is used, for example, to maintain customer records, invoices, warehouse inventory details, and various other forms of information. Accordingly, it is important that the storage facilities of such computer systems operate quickly and reliably.

FIG. 1 is a schematic block diagram of a typical known computer system 5 with storage facility. The system 5 includes a server 10 and two host bus adapters (HBAs) 12A and 12B, which are linked to the server by host bus 11A, and host bus 11B respectively. Various disk storage units are then attached to the two HBAs. Thus disk units 15A and 15B are attached to HBA 12A by links 14A and 14B respectively, and disk units 15C, 15D and 15E are attached to HBA 12B by links 14C, 14D and 14E respectively. Links 14A, B, C, D, and E typically use fiber channel or the small computer storage interface (SCSI) connections. Note that one of the HBAs (for example, HBA 12A) may utilize fiber channel, while another HBA (HBA 12B) may utilize a different protocol, such as SCSI.

It will be appreciated that there are a very wide range of possible configurations whereby storage units can be attached to server 10, and that FIG. 1 illustrates only a single such possibility. For example, there may be fewer or more HBAs for a given server, and the number of disk units attached to any given HBA is likewise variable. Furthermore, some systems may utilize tape storage in addition to, or instead of, disk storage, in which case these tape units are also connected to server 10 via an appropriate HBA.

FIG. 2 is an illustration of the sort of software typically utilised in controlling the storage hardware configuration shown in FIG. 1. This will be described in the context of the Solaris operating system (a form of Unix environment), available from Sun Microsystems Inc. Note that further details about this operating system can be found in: "Solaris Internals: Core Kernel Architecture" by Jim Mauro and Richard McDougall, Sun Microsystems Press/Prentice Hall, 2001, ISBN 0-13-022496-0, which is hereby incorporated by reference. Again, it will be appreciated that the software components shown in FIG. 2 are illustrative only, and that the skilled person will be aware of many other possible configurations and implementations.

The software structure depicted in FIG. 2 can be regarded as a form of hierarchy or protocol stack, at the top of which sits a user application 101 (which may be one of many application programs running on the server 10). In order to access the storage units 15, the application program 101 makes the appropriate system calls. These systems calls are received by the operating system (OS) 110 running on the server 10, and passed down a storage protocol stack. The stack includes a target driver 112, which is configured to understand about storage units at a high level (e.g. whether they are a disk or tape unit). Next is a SCSA layer 114, which implements the Sun common SCSI architecture (note that this protocol can actually be utilised over a fiber channel link as well as SCSI). The intent of SCSA 114 is to provide a generic interface for the higher level layers to send and receive SCSI commands without having to worry about details of the particular storage configuration in any given installation.

Underneath the SCSA 114 layer is the HBA device driver 116. As its name implies, this layer comprises code that allows the server 10 to interact with the HBA cards 12A,B. More especially, the HBA device driver 116 interacts with code 120 running on the HBA card itself. Code 120 is then able to interact with the actual disk units 15 in order to perform the desired storage access operation.

The hierarchy of FIG. 2 can be split into three main regions, namely a user level 130, a kernel level 140 and a device level 150. The user level 140 and the kernel level 140 both represent code running on server 10, whereas the device level code 150 is running separately on HBA card 12. The main piece of software at kernel level 140 is the operating system 110, which incorporates the target driver 112, the SCSA 114, and the HBA device driver 116. The operating system 110 is in effect a trusted piece of software, and accordingly it has many associated privileges in kernel mode to allow it to perform its processing. In contrast, the functionality that can be performed (directly) by an application 101 in user space 130 is much more limited than the functionality that can be performed by the operating system 110 within kernel mode 140. This helps to ensure that poorly behaved applications do not cause the entire system to crash.

An important concern at both the software and hardware level is to allow developers and engineers to obtain a good understanding of how a system operates. One reason for this for example is to be able to enhance or optimize code in order to improve performance (speed, reliability, and so on). Another motivation is to be able to diagnose and remedy any errors that are experienced.

One particular problem in a multi-component server system including various adapter cards and disk units is to be able to pinpoint the location of any known or suspected fault. To this end, it is desirable to isolate (in effect) the individual portions of the system. This then allows their behavior to be properly understood, independent of the state of the rest of the system.

Unfortunately however, in systems such as shown in FIGS. 1 and 2, the processing results (and any errors included in them) may be dependent upon the particular hardware configuration used. Moreover, given that such systems are usually designed to support a very wide range of possible equipment and configurations, a developer is frequently limited to being able to physically recreate only a very limited subset of such configurations.

For example, a particular customer may be experiencing a software problem with their installation. It is frequently impracticable to analyses these faults in detail on the customer machine itself, which may well be in a production environment and/or at some remote location. Accordingly, a support provider typically tries to reproduce these errors on a dedicated local machine for further investigation and diagnosis. However the support center may well not have the appropriate hardware to allow it to duplicate the precise configuration of the customer's system. Moreover, it may be difficult for cost or other reasons to acquire this hardware for testing purposes, especially if a wide range of units from different suppliers is involved, such as a server from one manufacturer, a first set of disk drives from another manufacturer, and a second set of disk drives from another.

One known approach to try to circumvent this problem is through the use of a simulator or emulator, such as shown in FIG. 3. This Figure matches FIG. 2, except that the HBA device driver 116 from FIG. 2 has now been replaced by a simulator 115, also known in this context as an HBA emulator. As its name suggests, the simulator 115 mimics the presence of a particular configuration of storage units (HBAs and disk drives) without these hardware devices actually needing to be present.

In order to achieve this, the simulator 115 receives storage commands from the application passed through the target driver 112 and the SCSA 114. The simulator then generates an appropriate response, which is passed back up to the application 101, where it appears as if it has come from a bona fide storage unit. This approach therefore allows the protocol stack (less the HBA device driver) within operating system 110 to be tested, but without needing the actual hardware storage units to be present (i.e. to be physically attached to the server 10).

The arrangement of FIG. 3 permits testing of a much broader range of configurations than would otherwise normally be possible. This testing can be used for investigating errors reported in existing installations, as well as for confirming that particular combinations of hardware and software (potentially from different suppliers) properly support one another—e.g. that they conform to the appropriate interfaces. The simulator can also be used in testing the development of new systems, including predicting the performance of large systems that have many disk units. This latter case may, for example, involve deciding how to allocate the disk units to available HBAs for maximum efficiency.

Nevertheless, the simulator configuration of FIG. 3 does suffer from certain drawbacks. In particular, since the simulator 115 is part of the operating system 110, any modification in the simulator behavior, such as perhaps to emulate a different configuration, generally requires the entire system to be rebooted. Furthermore, because the simulator 115 runs in kernel mode (since it is part of the operating system 110), any error that does occur will typically bring down the entire system. Given that the whole purpose of testing is often to push the system into error, it will be appreciated that a significant proportion of test runs will therefore result in a system crash, and so need a system reboot to proceed further.

It will be appreciated that in the above circumstances it is difficult to assess how a system typically behaves after a storage error (e.g. how robust the remainder of the processing is), given that a simulator error typically causes the whole system to crash. Furthermore, testing becomes rather time-consuming and expensive, since a system reboot will normally be needed between successive tests, either because test parameters are being changed, and/or because there was a system crash during the previous test run due to an error. (Note that such "error" may be intentional, in other words deliberately generated as part of the testing, or accidental, in that the test procedure itself for this particular investigation is still under development). Consequently, the use of an emulator such as shown in FIG. 3 in order to test the behavior of a storage system can represent a somewhat cumbersome and time-consuming activity.

SUMMARY OF THE INVENTION

Accordingly, one embodiment of the invention provides a method of simulating a target storage configuration for a computer system, where the target storage configuration may comprise multiple storage units. The method involves receiving a storage command from an application running on the computer system into a storage protocol stack on the computer system. The storage protocol stack is generally part of an operating system of the computer system and runs in kernel mode. The storage command is then intercepted within the storage protocol stack by a kernel simulator module incorporated into the storage protocol stack and forwarded from the kernel simulator module to a userland simulator module running in user mode. The userland simulator module generates a response to the storage command that emulates the behavior of the target storage configuration. This response is then sent back from the userland simulator module to the kernel simulator module, and from there returned to the application via the storage protocol stack. (N.B. the response may be modified as appropriate en route from the kernel simulator module to the application, in accordance with the normal operation of a storage protocol stack).

Since a significant portion of the simulator, namely the userland simulator module, and especially the command response generator, runs in user mode rather than kernel mode, this allows the behavior of the simulator to be modified or reconfigured without having to reboot the entire system. In addition, if there is a problem with the simulator, then this will not normally crash the complete system. This therefore significantly improves testing efficiency, and also enhances test flexibility, for example by enabling any user program to be readily integrated into the simulator environment.

Communications between the two simulator modules (i.e. the kernel simulator module and the userland simulator module) are typically implemented using an interprocess communication mechanism. In one particular embodiment, the kernel simulator module operates in effect as a client. Thus when the kernel simulator module receives a storage command from the application, it makes a call to the userland simulator module, which operates as a server. In response to the call, the userland simulator module returns to the kernel simulator module the appropriate response to the storage command.

The simulator is generally used for testing a computer system under various circumstances, such as with a particular emulated storage configuration. This may involve deliberately injecting faults into the response from the userland simulator module, or possibly manipulating the order of multiple storage commands received from the application. Such testing can be used to simulate an error condition, perhaps to try to recreate an observed failure mode. One possibility is to simulate the loss or recovery of a disk unit within a storage configuration.

The simulator can also be used to emulate the presence of multiple disks or other storage units (whether for testing or otherwise). In this situation, the userland simulator module provides disk storage for the application, where the disk storage emulates the presence of a set of multiple disks. Since the userland simulator module operates in user mode, there is considerable flexibility as to how this disk storage is actually provided. For example, the userland simulator module may access the underlying disk storage used to emulate the disks by utilizing the file system of the computer system. Alternatively, the userland simulator module may use a memory allocation command, such as the malloc call in C, or any other suitable mechanism, in order to provide the disk storage for emulating the desired disk configuration.

It is also possible to use a single data file to simulate multiple disks, thereby creating multiple views of the data in the file. This can be useful for emulating multi-path disks (i.e. disks that for redundancy have multiple connections to the system, typically via multiple HBAs).

In one embodiment, the userland simulator module emulates one or more SCSI targets. In this case, the storage commands are generally provided with command descriptor blocks (CDBs) in accordance with the SCSI format. These are then interpreted by the userland simulator module, and the appropriate SCSI responses are generated.

Typically the userland simulator module runs on the same computer system as the application that issues the storage commands. However, a more distributed approach is possible, in which the userland simulator module comprises two components, a first component running on the computer system itself, and a second component running on another computer system. In this case, the second component is responsible for generating the responses to the storage commands, while the first component is responsible for coordinating communications between the second component and the kernel application module.

In accordance with another embodiment of the invention there is provided a computer system having an operating system including a storage stack running in kernel mode and an application running on the operating system. The application is operable to issue storage commands to the operating system. The computer system further has a kernel simulator module running in kernel mode and a userland simulator module running in user mode. The kernel simulator module is incorporated into the storage stack to intercept storage commands from the application and to forward the storage commands to the userland simulator module. The userland simulator module includes a response generator that is operable to output responses emulating the behavior of a target storage configuration. These responses are then returned from the userland simulator module to the application via the kernel simulator module and the storage protocol stack.

In accordance with another embodiment of the invention there is provided a computer program product comprising a medium having program instructions for simulating a target storage configuration for a computer system. The program instructions when loaded into the computer system cause the computer system to implement a simulator. The simulator acts to intercept a storage command received from an application running on the computer system into a storage protocol stack on the computer system, where the storage protocol stack is part of an operating system of the computer system and runs in kernel mode. The interception is performed by a kernel simulator module incorporated into the storage protocol stack, which forwards the intercepted storage command to a userland simulator module running in user mode. The userland simulator module generates a response to the received storage command, the response emulating the behavior of the target storage configuration. The generated response is now sent back from the userland simulator module to the kernel simulator module, and then returned from the kernel simulator module to the application via the storage protocol stack.

In accordance with another embodiment of the invention there is provided apparatus for simulating a target storage configuration for a computer system comprising: means for receiving a storage command from an application running on the computer system into a storage protocol stack on the computer system, wherein the storage protocol stack is part of an operating system of the computer system and runs in kernel mode; means for intercepting the storage command within the storage protocol stack; means for forwarding the intercepted storage command to a userland simulator module running in user mode; means for generating a response to the storage command in the userland simulator module, the response emulating the behavior of the target storage configuration; and means for returning the response from the userland simulator module to the application via the storage protocol stack.

It will be appreciated that the computer system, computer program product, and apparatus embodiments of the invention will generally benefit from the same particular features as the method embodiment of the invention.

BRIEF DESCRIPTION OF THE DRAWINGS

Various embodiments of the invention will now be described in detail by way of example only with reference to the following drawings in which like reference numerals pertain to like elements and in which.

DETAILED DESCRIPTION

Figure 4:
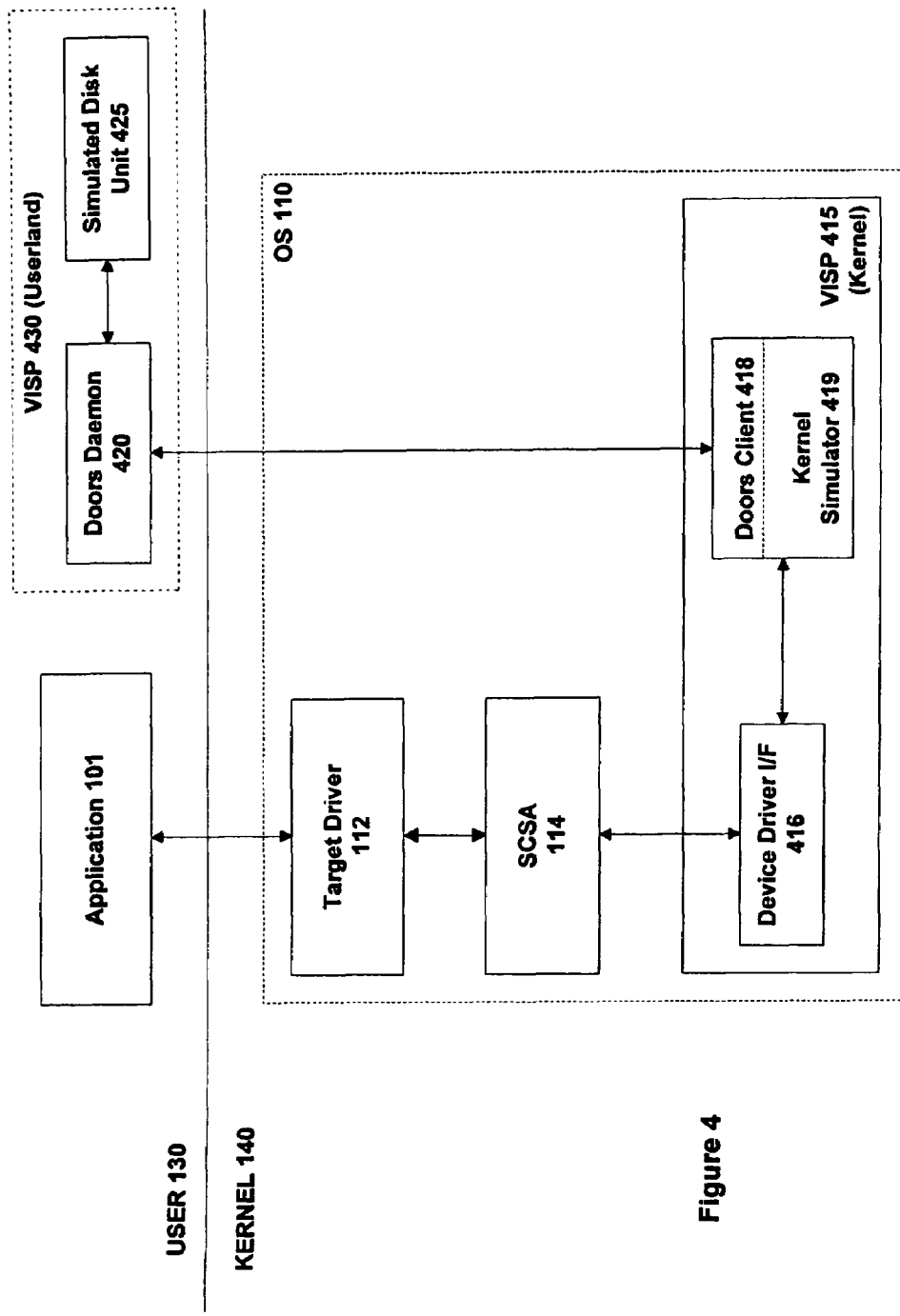
FIG. 4 illustrates a storage test facility in accordance with one embodiment of the present invention.

FIG. 4 illustrates a storage testing environment in accordance with one embodiment of the invention. The software components shown in FIG. 4 are generally loaded from a system memory into a processor for execution on the system. Some or all of these components may be pre-installed onto one or more hard disk units, or loaded off some portable storage medium, such as a magnetic tape, CD ROM, DVD, etc (not shown in FIG. 4). Alternatively, some or all of the software components may be downloaded via a transmission medium over a network (again not shown in FIG. 4). Note that software obtained from a transmission or portable storage medium may be saved onto a hard disk for subsequent (re)use by the system, or may be loaded directly for execution into system memory.

Figure 1:
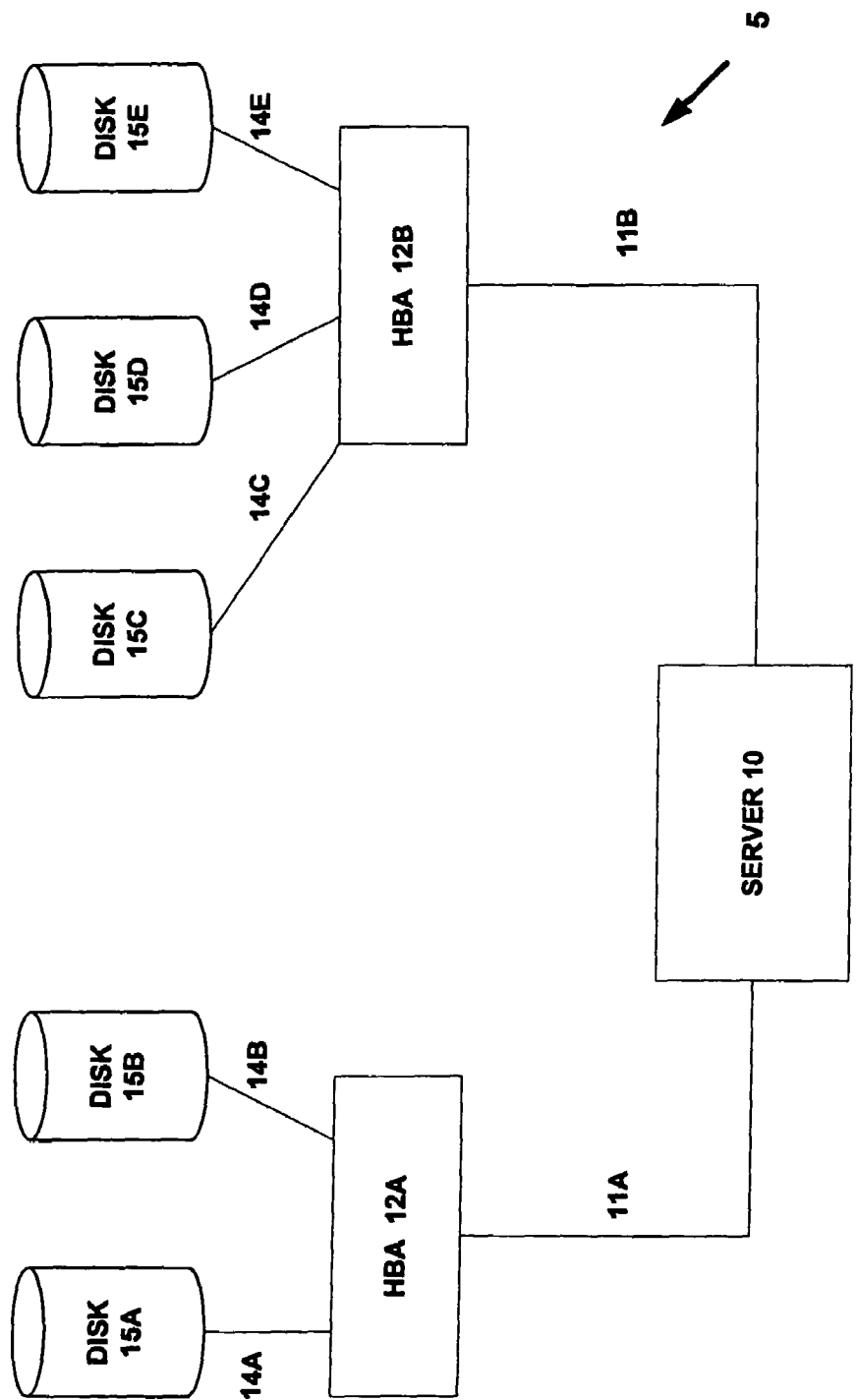
FIG. 1 is a schematic representation of a computer system, showing various hardware components including storage units.
Figure 2:
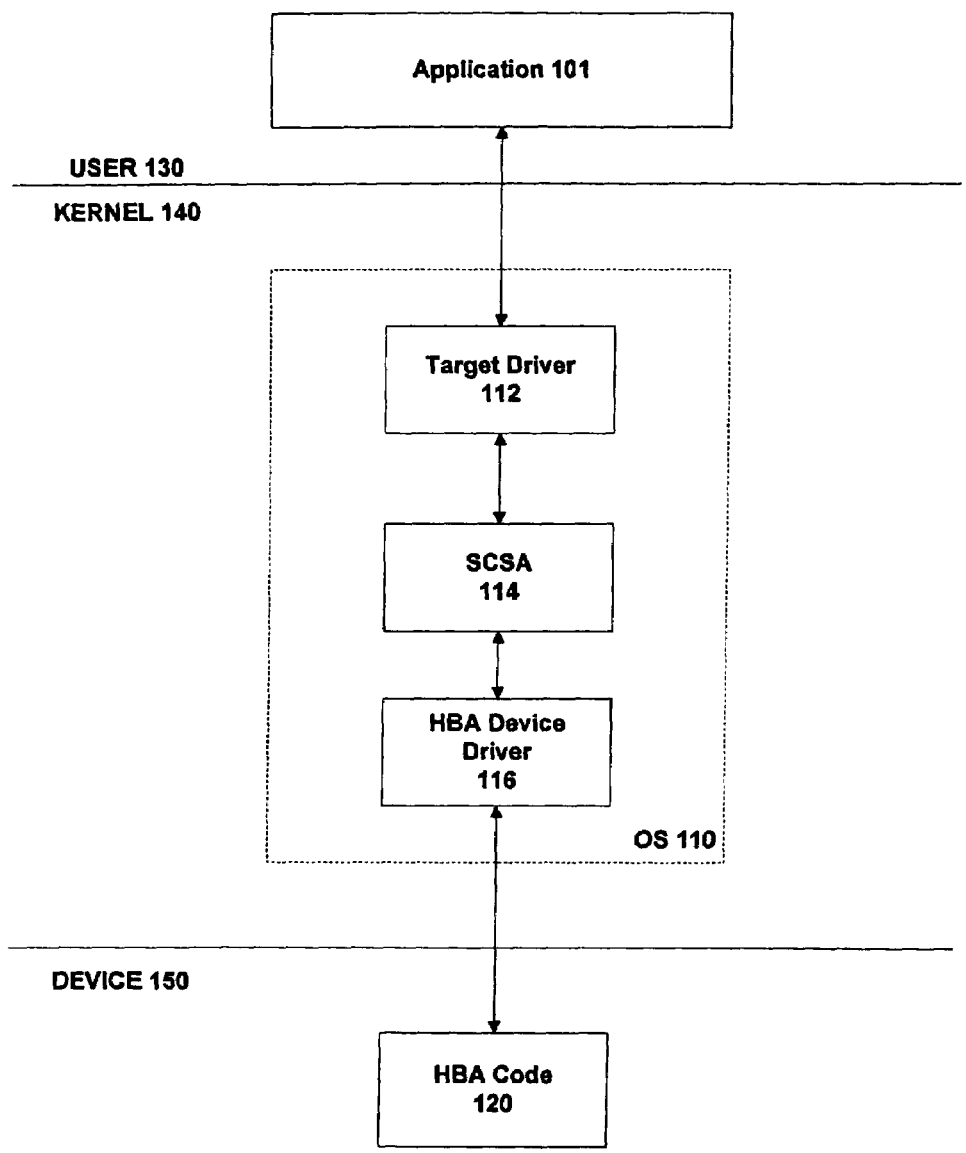
FIG. 2 is a schematic diagram of the software components typically utilised in order to access the hardware storage components of FIG. 1.
Figure 3:
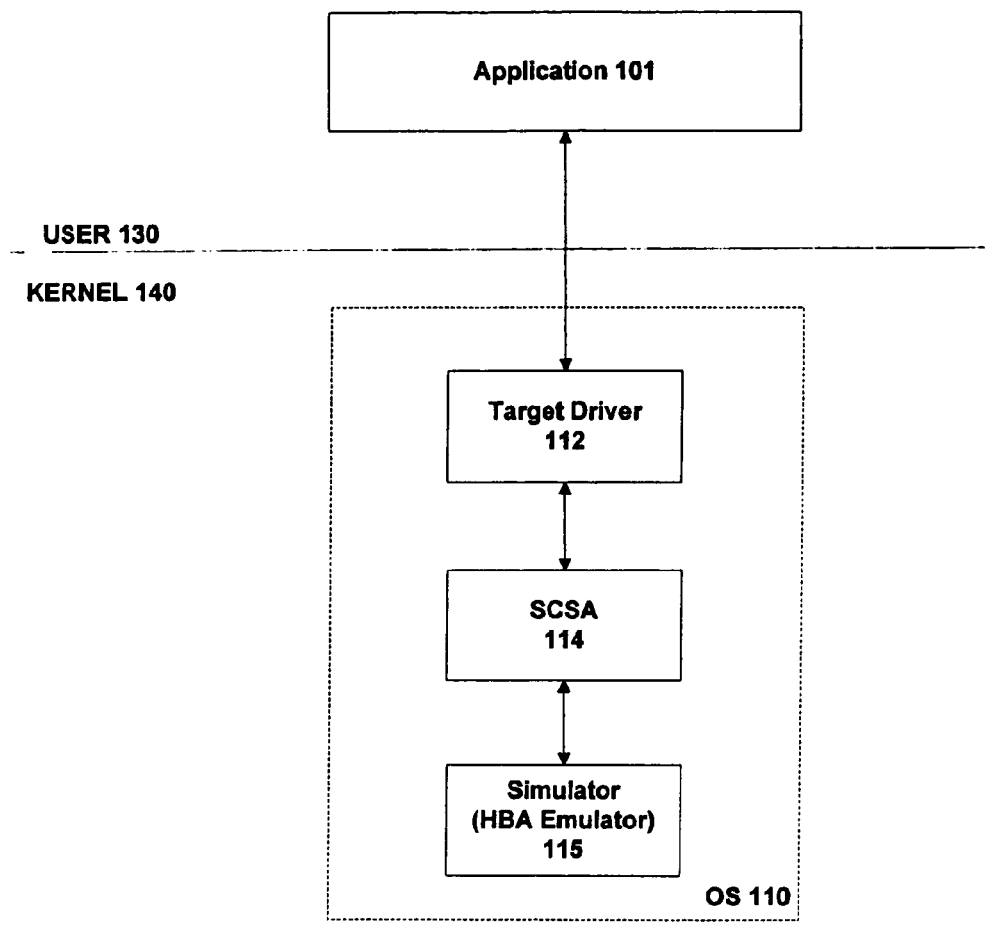
FIG. 3 illustrates a modification of the software stack of FIG. 2, in which the presence of certain hardware components from FIG. 1 is emulated in order to simplify testing.

Some of the components shown in FIG. 4 match those illustrated in FIG. 3. Thus again we have an application 101 in user mode 130 that generates storage commands and directs them to the operating system 110 running in kernel mode 140. More particularly, the commands are passed through a storage protocol stack within operating system 110, including a target device driver 112 and a SCSA layer 114. The output from the SCSA layer is typically a set of SCSI packets for transmission out over a storage bus, such as provided by a SCSI link, with each packet comprising a command descriptor block (CDB) and an associated payload.

Note that the operating system protocol stack may include additional elements not shown in FIG. 4 typically located between the application 112 and the target driver 112. These potentially include I/O libraries and file systems, as well as a volume manager for managing a set of disks, such as the VxVM volume manager from Veritas Software Corporation. A more detailed example of a typical full protocol stack is provided in the above-mentioned book by Mauro and McDougall (see especially page 470).

As in FIG. 3, a simulator is provided below the SCSA layer 114 that is responsible for emulating the presence of an HBA and its associated storage units. The simulator in FIG. 4 is referred to as VISP, and can be regarded as a form of virtual bus together with associated targets. In operation, the VISP simulator receives storage commands from the SCSA layer 114, typically in the form of SCSI packets, and generates appropriate responses which are passed back up the protocol stack to the application 101. These responses make it appear to the application 101 and to the rest of the storage protocol stack (i.e. that above the simulator) that the computer system is in fact equipped with the storage configuration that is being simulated. This then allows the operation and behavior of the application 101 and operating system protocol stack during storage activity to be investigated.

Nevertheless, the implementation of the VISP simulator as shown in FIG. 4 is quite different from the simulator of FIG. 3. Thus VISP comprises two main components, a VISP kernel portion 415 and a VISP userland portion 430. The former is incorporated into the storage protocol stack within operating system 110, and sits beneath the SCSA layer 114. The VISP kernel portion 415 intercepts storage commands that the SCSA layer 114 directs (it thinks) to an HBA. The VISP kernel portion 415 also returns responses to these intercepted storage commands back to the SCSA layer 114. These responses are then passed up through the storage protocol stack to application 101, thereby simulating the presence of a genuine HBA and associated storage unit(s).

Note however that the VISP kernel portion 415 itself does not normally generate the responses to the storage commands from application 101. Instead, it routes the incoming or intercepted storage commands to the VISP userland portion 430. The VISP userland portion 430 runs as an ordinary application in user mode 130 (in contrast to the VISP kernel portion 415, which is running in kernel mode 140). The VISP userland portion 430 generates responses to the incoming storage commands. These responses are then returned from the VISP userland portion 430 to the VISP kernel portion 415, for passing back up the protocol stack to application 101.

Looking in more detail now at the structure of the VISP kernel portion 415 and the VISP userland portion 430, the former includes a device driver interface 416 and a kernel simulator 419. The device driver interface 416 receives and interprets the format of commands received from SCSA layer 114, which can then be passed to the kernel simulator. The device drive interface 416 is also responsible for formatting and transmitting the responses generated by VISP back to the SCSA layer. These responses are passed to the device driver interface 416 by the kernel simulator 419.

The kernel simulator 419 receives incoming storage commands from the device driver interface 416, and returns appropriate responses to these commands back to the device driver interface. In one mode of operation, the kernel simulator generates at least some of these responses itself internally. This mode is particularly useful when speed of response is important, since the path length for processing a storage command is reduced. However, in general the kernel simulator 419 communicates with the VISP userland portion 430, which is responsible for generating and providing the responses to the storage commands.

Messaging between the kernel simulator 419 and the VISP userland portion 430 is supported in the illustrated embodiment by using a "Doors" interface. "Doors" is an interprocess communication mechanism supported by the Solaris operating system, in which a doors client process makes a call to a doors server process, and subsequently receives a response back to the call. Although the doors interface is generally used by an application process to access a kernel process, it is used here in the reverse direction. Further details about doors in the Solaris operating system can be found in the above-referenced book by Mauro and McDougall (see especially pages 459-467). It will be appreciated that other platforms and environments have analogous mechanisms to support interprocess communications that could be used instead of doors on these respective platforms.

In order to utilize the doors mechanism, the kernel simulator 419 incorporates a doors client 418, while the VISP userland portion 430 includes a door daemon 420 that functions as a doors server. Thus the kernel simulator 419 uses the doors client 418 to make doors calls to the doors daemon 420. This then allows the kernel simulator 419 to pass storage commands received via the protocol stack from application 101 to the VISP userland portion 430 using the doors interface. Subsequently, the VISP userland portion 430 uses the doors daemon to return the appropriate responses to the incoming storage commands back over the doors link to doors client 418, from where they are returned to the application 101 via the protocol stack.

The VISP userland portion 430 includes a simulated disk unit 425. (Note that for simplicity VISP userland portion 430 is shown in FIG. 4 as having only a single simulated disk unit 425, but it may in fact incorporate multiple simulated disk units and/or multiple simulated tape units). The simulated disk unit 425 is responsible for actually generating the appropriate response to a particular storage command issued by application 101, depending on the particular CDB and associated payload. (It will be appreciated that units for generating such emulated responses are already known per se to the skilled person, since they are incorporated into existing simulation systems such as depicted in FIG. 3, and accordingly they will not be described in detail herein).

In operation therefore, doors daemon 420 receives a storage command from the doors client 418, and passes this command to the (relevant) disk simulation unit 425. The disk simulation unit 425 then generates an appropriate response to this command. Note that the response may represent a nominally correct response to the storage command, or it may have a fault deliberately injected into it. For example, one or more bits of the nominally correct response may be corrupted, or the response may be provided outside a timeout period for the specified storage communications protocol being emulated. The skilled person will be aware of other ways in which the disk simulation unit 425 may adjust its response according to the desired form of testing to be employed. Once the disk simulation unit 425 has generated its response, this response is then passed back to the doors daemon 420, which in turn forwards it to the doors client 418 in the kernel simulator 419. From there, the response is passed through the storage protocol stack back to the application 101.

The VISP kernel portion 415 in conjunction with the VISP userland portion 430 forms a simulator that can be used to emulate the presence of one or more HBAs. Such simulation is valuable in a wide range of circumstances, as already discussed in relation to existing systems. An important aspect of the simulator of FIG. 4 however is that the generation of appropriate test responses to storage commands is now performed in user mode 130. This provides significant advantages over the situation in existing simulators, such as shown in FIG. 3, where in contrast the simulation is performed entirely in kernel mode 140.

Thus in the embodiment of FIG. 4 it is possible to amend the behavior of simulated disk unit 425 by simple recompilation of an application, without having to reboot the entire system. This considerably speeds up the overall testing process, especially if many different versions of the simulated disk unit 425 need to be used one after another. This is typically likely to occur either when a disk unit simulator 425 is itself being developed, perhaps to emulate a newly available disk unit, or when it is desired to perform a set of simulations with a range of simulation parameters. Thus the latter task can now be automated by a script that performs successive test cycles, with each cycle updating the disk unit simulator 425 as desired, recompiling the VISP userland portion 430 as necessary, and then performing the test run itself.

One significant reason for wanting to adjust simulation parameters is where a particular failure mode has been observed at a customer location, but the reason for this is not understood. By experimenting with a range of simulation parameters, it may be possible to recreate the failure mode, and so to develop an insight into the underlying problem and its solution. It will be appreciated that this form of diagnosis can be performed much more efficiently without having to reboot between each simulation.

A further significant benefit of having the VISP userland portion 430 is that even if an error does arise in the simulation process, then this should only crash the VISP userland portion 430, which is in effect an application running on the system, rather than the entire system itself. Consequently, there is no need for a system reboot prior to performing the next test, rather only the VISP userland portion 430 needs to be restarted. Note that such an error in the simulation process may be due to deliberately injecting a fault into the system, as part of the testing regime, or because the simulator itself is still under development (e.g. to recreate a new system or newly observed failure mode), and so liable to fault.

The fact that a simulation fault does not bring down the whole system helps to reduce the cycle time between successive tests, and allows a series of tests to be run automatically if so desired. Moreover, it also potentially allows simulation modes that may not be possible on existing test systems such as shown in FIG. 3. Thus if the VISP userland portion 430 does crash due to some error (deliberately injected or otherwise), then the remainder of the system should not succumb to a system crash, but rather should continue to operate. Accordingly, the behavior of this portion of the system, including in particular the storage protocol stack, can still be observed. It will be appreciated that this may give an insight into how the system would cope with the loss of a disk unit or some other storage component, and that such insight would not normally be obtainable if the error had caused the whole test system to crash (as for the simulator of FIG. 3).

The presence of the VISP userland portion 430 in user space 130 also permits a wider range of testing to be performed than can easily be achieved in kernel space, since the various parts of the simulator environment are more readily accessible to other user test programs. For example, a queue of incoming storage commands may be maintained by the disk simulation unit 425, and the order of commands in this queue altered or manipulated to see how this affects system behavior. This can then help to develop an understanding of system performance (e.g. if small storage tasks in the queue were promoted ahead of large storage tasks, would this improve overall efficiency).

Figure 5:
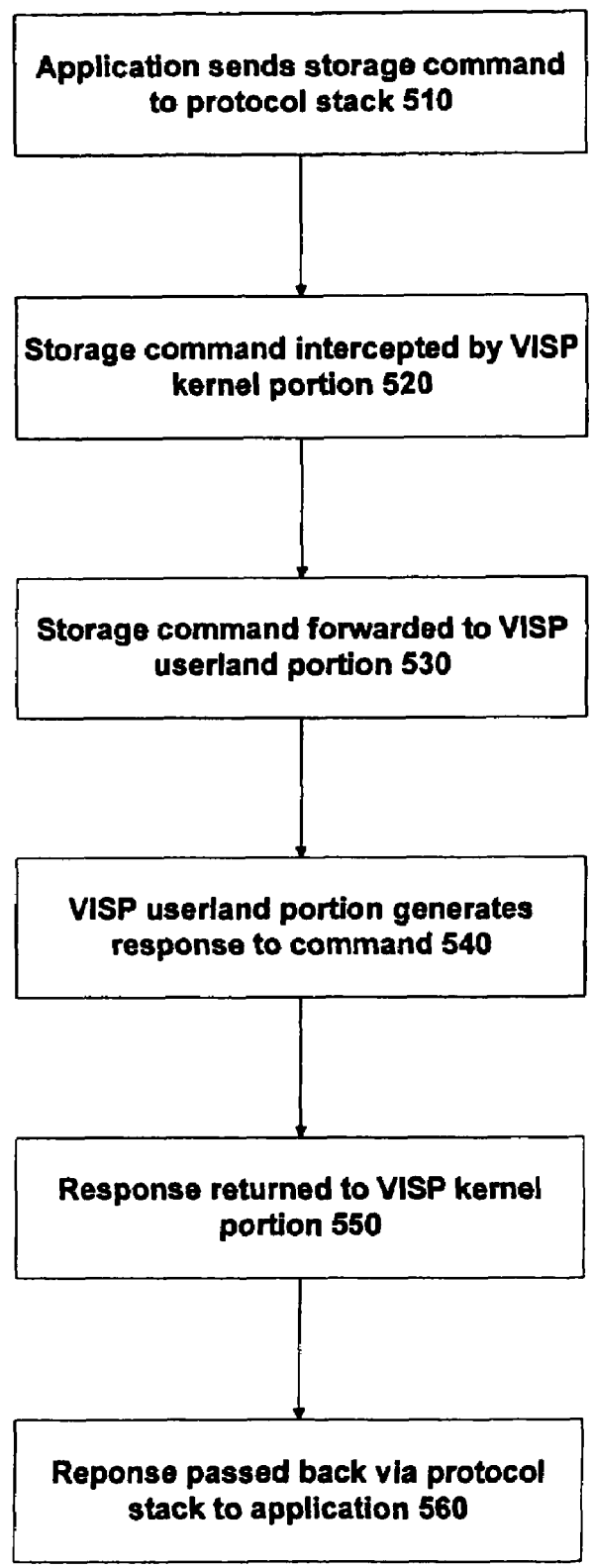
FIG. 5 is a flowchart depicting the operation of the storage test facility of FIG. 4.

FIG. 5 is a flowchart depicting the operation of the storage test configuration of FIG. 4. The method commences with the application 101 issuing a storage command to the operating system 110 (step 510), which is forwarded to the storage protocol stack to handle. More particularly, the command passes through the target driver 112 and the SCSA layer 114 to where it is intercepted by the VISP kernel module 415 (step 520). As far as the rest of the protocol stack is concerned, i.e. from the perspective of the SCSA layer 114, the VISP kernel portion 415 appears to be a target host bus adapter (HBA). Accordingly the VISP kernel portion 415 emulates such an HBA in terms of the responses that it provides back to the SCSA layer 114.

In order to perform this emulation, the VISP kernel portion 415 incorporates a doors client 418 that uses the doors interprocess communication mechanism to forward the storage command to the VISP userland module 430, which runs in user mode (step 530). The VISP userland portion 430 includes a daemon 420 that acts as a doors server to requests from the doors client 418. The daemon therefore receives a request from the doors client 418, and passes it to a disk simulation unit 425 included within the VISP userland portion 430. The disk simulation unit 425 generates an appropriate response to the received storage command (step 540), which may include the deliberate injection of a fault for testing purposes.

The generated response is then passed back from the VISP userland portion 430 to the VISP kernel portion 415 (step 550), again using the doors mechanism (as a response by the doors server 420 to the original request from the doors client 418). The VISP kernel portion 415 then returns the response via the protocol stack to the application 101 (step 550). In this manner, it is possible to investigate the (simulated) behavior of the computer system for a range of storage commands from application 101.

As an example of the sorts of simulated behavior injected by VISP kernel portion 415, the simulator may react as if disks have disappeared or become unknown, and inform the operating system of such an occurrence. Conversely, the simulator may call up into the operating system to announce the appearance of one or more new disks. Note that such testing is particularly relevant for a fiber channel environment (where the loss and recovery of disk units is more frequent than on SCSI).

A further form of simulation involves the userland simulator presenting a single data file to emulate multiple disk units. This results in multiple views of the data, analogous to a multi-pathed disk—i.e. a disk which is visible down different paths of the operating system. Such multipath configurations are typically found in implementations where a single disk unit is connected to a system from multiple attachment points via multiple cables to multiple HBAs (this helps to provide redundant access to the data stored on the disk, in case there is a failure along one of the connection paths). The use of a single data file emulating multiple disk units can therefore be used for testing such a multipath configuration.

Figure 6:
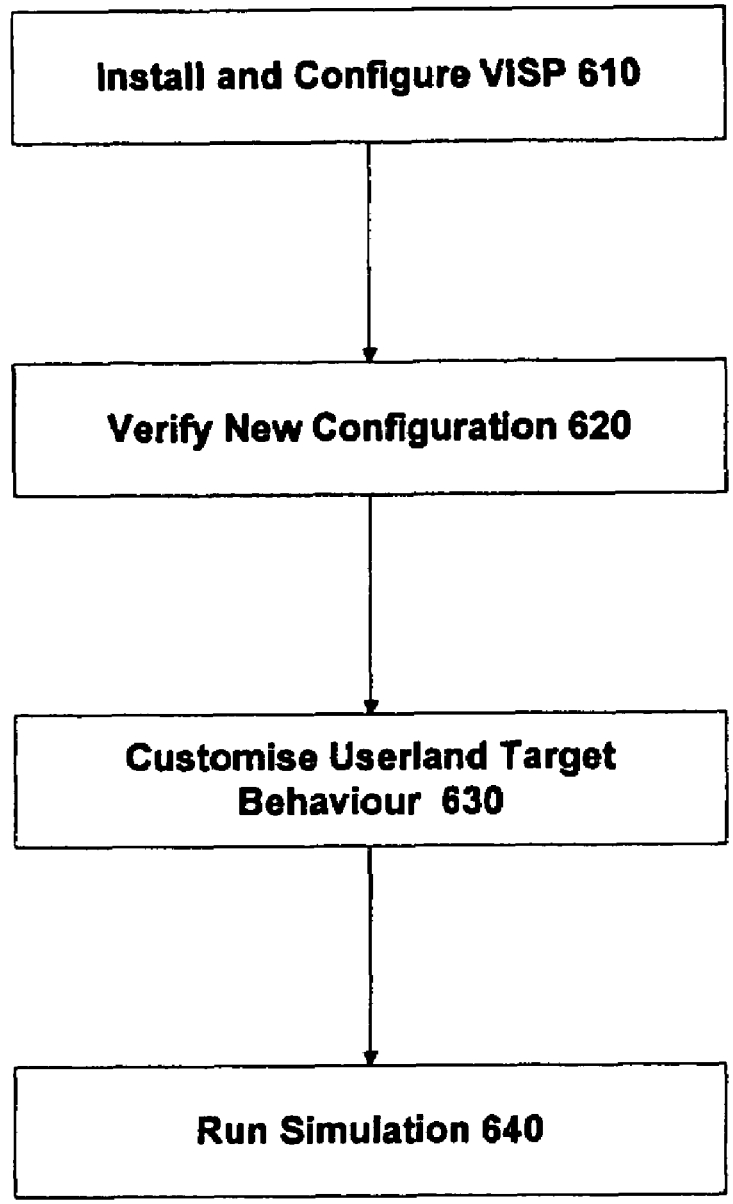
FIG. 6 is a flowchart depicting the installation and configuration of the storage test facility of FIG. 4.

FIG. 6 presents a flowchart depicting the installation and configuration of the VISP simulator, and how it is set up for use. The method starts with installing the VISP software package using an installation script, followed by an initial configuration (step 610). The initial configuration involves defining target devices and associated logical unit numbers (luns), as well as the size of the relevant disk. (In one particular implementation, the size of the disk is specified as a number of blocks, each block representing 512 bytes). The configuration procedure also specifies whether the disks are to be managed from the VISP userland portion 430 or from the VISP kernel portion 415. In the former case, the configuration process involves specifying the name of the file to back the (simulated) disk, while in the latter case, the disk space is allocated from pinned kernel memory. (Pinned memory is memory that has been set as non-pageable, sometimes referred to as wired, and so must be retained in physical memory, and cannot be swapped out to disk; see the above mentioned book by Mauro and McDougall for more details, especially pages 205-206).

The user-selected parameters for each simulated disk are stored in a VISP configuration file. The system generally now performs a reconfiguration boot in order for these new targets to be visible to the system. Thus the reboot allows the new VISP targets to be found and loaded into the system, based upon the configuration file, whereupon the presence of these new VISP targets can be verified, such as by using the ls (list) command (step 620).

The core behavior of the VISP simulator is determined by the disk simulation unit 425. This may be modified to investigate the operation of the computer system in the presence of particular circumstances or faults, such as by varying the response to certain commands or to certain sequences of commands (step 630). In one implementation such modification of the disk simulation unit involves reprogramming and then recompiling the disk simulation unit 425 to produce the newly specified behavior. The recompilation includes linking the modified disk simulation unit 425 to the doors daemon 420. However, in other embodiments, it may be possible to alter simulation behavior without such recompilation, such as by using a table or script file to govern the operation of the disk simulation unit 425. At this stage, the VISP simulator is now ready to run a simulation test (step 640).

Although the VISP simulator has been described primarily for use in a test environment, it does have other potential applications outside this environment. For example, consider the situation where it is desired to have more disk units than are currently present. Such a situation may perhaps arise with an application that has been designed to work with a predetermined number of disk units. However, if one or more of these disk units has failed or been removed, or the application is now running on a different system with fewer disks, the requisite number of disk units may no longer be available. In such a situation, the VISP simulator can be used to emulate the presence of the extra disk units required for the application.

Note that the VISP userland portion 430 can write data to one or more files (stored on the available disk unit(s)) and read data back from such files in the same way as any other user application. Consequently the VISP simulator can use the available disk unit(s) to provide the underlying storage capacity in order to emulate a multi-unit storage system to the application 101. This emulation of multiple disk units may also be performed by the kernel simulator 419 in the VISP kernel portion 415 if so desired (this would tend to enhance response times because of the shorter path length). However, in this case the simulated disks would be allocated from wired kernel memory, which implies a size limitation.

In contrast, if disk units are simulated by the VISP userland portion 430, they can be backed by a variety of mechanisms, such as a raw file, a disk device, memory allocated via the "malloc" call in the C programming language, etc. Accordingly, there is no particular constraint on simulated storage space, apart from the overall capacity available to the system.

The skilled person will be aware of a variety of modifications to the simulator described herein. For example, although the VISP userland portion 430 will typically all reside on the same machine as the operating system 110, the VISP userland portion 430 might instead be distributed across multiple machines. For example, the doors daemon 420 could be on a first machine, and the disk simulation unit 425 on another machine. The VISP userland portion 430 would then include suitable communications software to allow the doors daemon 420 and the disk simulation unit 425 to communicate with one another over a suitable network link between the first and second machines.

In conclusion therefore, although a variety of particular embodiments have been described in detail herein, it will be appreciated that this is by way of exemplification only. Accordingly, the skilled person will be aware of many further potential modifications and adaptations that fall within the scope of the claimed invention and its equivalents.

The invention claimed is:

1. A method of simulating a target storage configuration for a computer system, wherein the target storage configuration may comprise multiple storage units, the method comprising:
  receiving a storage command from an application running on the computer system into a storage protocol stack on the computer system, wherein said storage protocol stack is part of an operating system of the computer system and runs in kernel mode;
  intercepting the storage command within the storage protocol stack by a kernel simulator module incorporated into the storage protocol stack;
  forwarding the intercepted storage command from the kernel simulator module to a userland simulator module running in user mode;
  generating a response to the storage command in the userland simulator module, said response emulating the behavior of the target storage configuration;
  sending the generated response from the userland simulator module to the kernel simulator module;
  returning the response from the kernel simulator module to the application via the storage protocol stack, wherein said returned response comprises data which provides an appearance to the application that the response came from a storage configuration being simulated by the userland simulator module; and
  changing the target storage configuration being simulated without changing the kernel simulator module.

2. The method of claim 1, wherein the userland simulator module runs on the computer system; and
  wherein changing the target storage configuration being simulated comprises modifying the userland simulator module.

3. The method of claim 1, wherein the userland simulator module comprises two components, a first component running on the computer system, and a second component running on another computer system, and wherein the second component is responsible for generating the response to the storage command, and the first component is responsible for co-ordinating communications between the second component and the kernel simulator module.

4. The method of claim 1, wherein the storage command is forwarded from the kernel simulator module to the userland simulator module and the response is sent from the userland simulator module to the kernel simulator module using an interprocess communication mechanism.

5. The method of claim 1, further comprising using the userland simulator module to provide disk storage for said application, said disk storage emulating the presence of a set of multiple disks.

6. The method of claim 5, wherein said disk storage is provided by utilizing a file system of the computer system.

7. The method of claim 6, wherein a single file is used to emulate the presence of a multipathed disk that provides multiple views of the same data.

8. The method of claim 5, wherein said disk storage is provided by using a memory allocation command.

9. The method of claim 1, further comprising deliberately injecting a fault into the response to simulate an error condition.

10. The method of claim 1, further comprising manipulating the order of multiple storage commands received from the application to simulate an error condition.

11. The method of claim 1, further comprising simulating the loss of a disk unit within said target storage configuration.

12. The method of claim 1, further comprising simulating the recovery or insertion of a disk unit within said target storage configuration.

13. The method of claim 1, wherein the userland simulator module emulates a plurality of SCSI targets.

14. A computer system comprising:
one or more processors coupled to one or more storage units, wherein the one or more processors are operable to execute program instructions corresponding to:
an operating system including a storage protocol stack running in kernel mode;
an application running on the operating system, wherein the application is operable to issue storage commands to the operating system;
a kernel simulator module running in kernel mode and a userland simulator module running in user mode, wherein the kernel simulator module is incorporated into said storage protocol stack to intercept storage commands from the application and to forward the storage commands to the userland simulator module;
a response generator included in the userland simulator module, said response generator being operable to output responses emulating the behavior of a target storage configuration, wherein the target storage configuration may comprise multiple storage units, and wherein said responses are returned from the userland simulator module to the application via the kernel simulator module and the storage protocol stack, and wherein said returned response comprises data which provides an appearance to the application that the response came from the target storage configuration being simulated by the userland simulator module; and
changing the target storage configuration being simulated may be accomplished without changing the kernel simulator module.

15. The system of claim 14, wherein storage commands are forwarded from the kernel simulator module to the userland simulator module and responses are sent from the userland simulator module to the kernel simulator module using an interprocess communication mechanism.

16. The system of claim 14, wherein the userland simulator module is used to provide disk storage for said application, said disk storage emulating the presence of a set of multiple disks.

17. The system of claim 16, wherein said disk storage is provided by utilizing a file system of the computer system.

18. The system of claim 17, wherein a single file is used to emulate the presence of a multipathed disk that provides multiple views of the same data.

19. The system of claim 16, wherein said disk storage is provided by using a memory allocation command.

20. The system of claim 14, wherein faults are deliberately injected into the system to simulate an error condition for testing purposes.

21. The system of claim 14, further comprising simulating the loss of a disk unit within said target storage configuration.

22. The system of claim 14, further comprising simulating the recovery or insertion of a disk unit within said target storage configuration.

23. The system of claim 14, wherein the userland simulator module emulates a plurality of SCSI targets; and
wherein changing the target storage configuration being simulated comprises modifying the userland simulator module.

24. A computer readable storage medium storing program instructions for simulating a target storage configuration for a computer system, wherein the target storage configuration may comprise multiple storage units, said program instructions when loaded into the computer system causing the computer system to implement a simulator that:
intercepts a storage command received from an application running on the computer system into a storage protocol stack on the computer system, wherein said storage protocol stack is part of an operating system of the computer system and runs in kernel mode, and said interception is performed by a kernel simulator module incorporated into the storage protocol stack;
forwards the intercepted storage command from the kernel simulator module to a userland simulator module running in user mode;
generates a response to the storage command in the userland simulator module, said response emulating the behavior of the target storage configuration;
sends the generated response from the userland simulator module to the kernel simulator module;
returns the response from the kernel simulator module to the application via the storage protocol stack, wherein said returned response comprises data which provides an appearance to the application that the response came from a storage configuration being simulated by the userland simulator module; and
changes the target storage configuration being simulated without changing the kernel simulator module.

25. The computer readable storage medium of claim 24, wherein the userland simulator module runs on the computer system; and
wherein the simulator changes the target storage configuration being simulated by modifying the userland simulator module.

26. The computer readable storage medium of claim 24, wherein the storage command is forwarded from the kernel simulator module to the userland simulator module and the response is sent from the userland simulator module to the kernel simulator module using an interprocess communication mechanism.

27. The computer readable storage medium of claim 24, wherein the userland simulator module provides disk storage for said application, said disk storage emulating the presence of a set of multiple disks.

28. The computer readable storage medium of claim 27, wherein said disk storage is provided by utilizing a file system of the computer system.

29. The computer readable storage medium of claim 28, wherein a single file is used to emulate the presence of a multipathed disk that provides multiple views of the same data.

30. The computer readable storage medium of claim 27, wherein said disk storage is provided by using a memory allocation command.

31. The computer readable storage medium of claim 24, wherein a fault is injected into the response to simulate an error condition.

32. The computer readable storage medium of claim 24, wherein the order of multiple storage commands received from the application is manipulated to simulate an error condition.

33. The computer readable storage medium of claim 24, further comprising simulating the loss of a disk unit within said target storage configuration.

34. The computer readable storage medium of claim 24, further comprising simulating the recovery or insertion of a disk unit within said target storage configuration.

35. The computer readable storage medium of claim 24, wherein the userland simulator module emulates a plurality of SCSI targets.

36. Apparatus for simulating a target storage configuration for a computer system, wherein the target storage configuration may comprise multiple storage units, said apparatus comprising:

means for receiving a storage command from an application running on the computer system into a storage protocol stack on the computer system, wherein said storage protocol stack is part of an operating system of the computer system and runs in kernel mode;

means for intercepting the storage command within the storage protocol stack by a kernel simulator module incorporated into the storage protocol stack;

means for forwarding the intercepted storage command to a userland simulator module running in user mode;

means for generating a response to the storage command in the userland simulator module, said response emulating the behavior of the target storage configuration;

means for returning the response from the userland simulator module to the application via the storage protocol stack, wherein said returned response comprises data which provides an appearance to the application that the response came from a storage configuration being simulated by the userland simulator module; and means for changing the target storage configuration being simulated without changing the kernel simulator module.

* * * * *